United States Patent

Upham et al.

[11] Patent Number: 5,769,285
[45] Date of Patent: Jun. 23, 1998

[54] CALF NIPPLE

[75] Inventors: George Lynn Upham, Tulare; John Dilsaver, Corona, both of Calif.

[73] Assignee: Veterinarian's Outlet Inc., Tulare, Calif.

[21] Appl. No.: 603,637

[22] Filed: Feb. 20, 1996

[51] Int. Cl.$^6$ .................................................. B67D 3/00
[52] U.S. Cl. ..................... 222/481.5; 222/490; 215/11.1; 215/11.5
[58] Field of Search ................................ 222/481.5, 490; 215/11.7, 11.5

[56] References Cited

U.S. PATENT DOCUMENTS

| | | | |
|---|---|---|---|
| 3,593,870 | 7/1971 | Anderson | 215/11.5 |
| 4,993,568 | 2/1991 | Morifuji et al. | 215/11.5 X |
| 5,474,028 | 12/1995 | Larson et al. | 215/11.5 X |

FOREIGN PATENT DOCUMENTS 0437148  7/1991  European Pat. Off. ............. 215/11.1

OTHER PUBLICATIONS

Exhibits 1 and 2 are photographs of a prior art calf nipple produced by Merrick Manufacturers; and.
Exhibits 3 and 4 are photographs of a prior art calf nipple produced by Manna Pro Corporation.

*Primary Examiner*—Joseph Kaufman
*Attorney, Agent, or Firm*—Hovey, Williams, Timmons & Collins

[57] ABSTRACT

A nipple broadly includes a base adapted for coupling to a source of liquid, and an elongated tubular wall presenting a liquid-carrying channel and defining a longitudinal axis. The tubular wall includes a proximate end adjacent to the base and a tip remote from the base. The tip substantially encloses the channel. A liquid passageway is formed through the tip for permitting passage of the liquid from the channel to an animal. A tip ridge is provided on the tip which extends substantially around the passageway. The tip ridge is configured to inhibit the passageway from cracking and growing during usage of the nipple. The base includes an aspiration port for permitting passage of air into the source so that the pressure of the air above the liquid is equalized with the pressure of the air surrounding the source. The aspiration port includes a aspiration slit formed through the base. The aspiration slit is generally normal to a plane defined by the longitudinal axis of the tubular wall and the port. The aspiration slit is configured to be in a closed condition while the nipple is at rest, and to open slightly as the animal pulls on and squeezes the nipple while drawing liquid from the source.

9 Claims, 1 Drawing Sheet

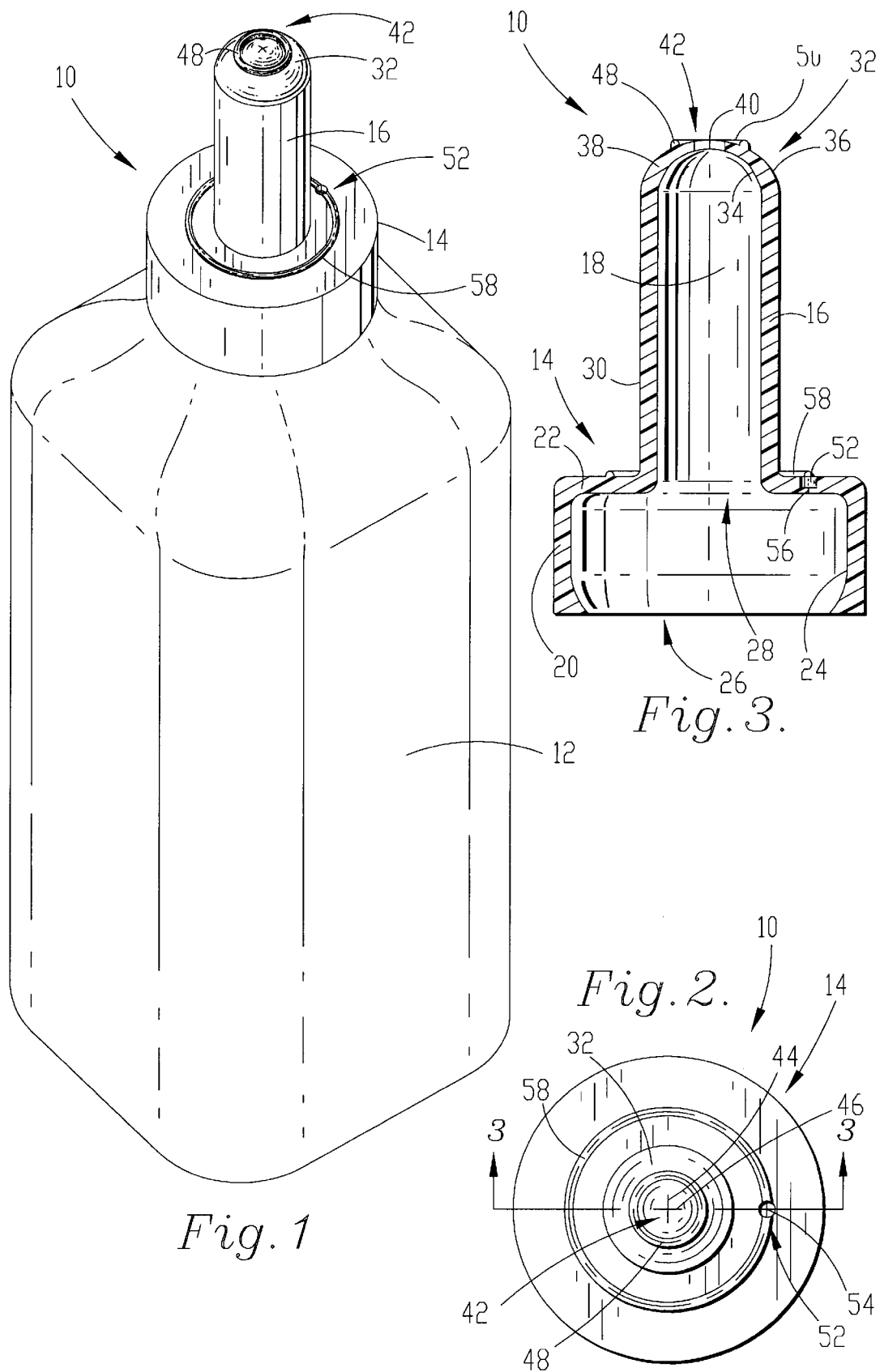

CALF NIPPLE

BACKGROUND OF THE INVENTION

1. Field of the Invention

The present invention relates generally to a nipple for attachment to a bottle or other source of nourishment for young animals. More particularly, the invention relates to a slitted, resilient nipple configured for attachment to a source of liquid for dispensing a quantity of the liquid to an animal for nourishment of the animal.

2. Description of the Prior Art

Presently, dispensing devices are provided which are configured to be attached to a source of a nourishing liquid for dispensing the liquid to feed a young animal. Bottles or pails are commonly used as a source of liquid. Such a bottle usually includes a neck at an upper end having an opening. A nipple is commonly used as a dispensing device, and is configured to be attached to the neck of the bottle to cover the opening. Such bottles are used particularly in the dairy industry to free the cow from nursing the calf so that milk production is optimized.

It is known to provide a nipple which comprises a unitary body of resilient material having a base end, and an elongated, tubular portion with a tip end. The base end of the prior art nipple is configured to be attached to the bottle neck to cover the opening. The tubular portion defines a liquid-carrying channel extending between the tip end and the base end.

A pair of intersecting passageway slits presenting an X-shape is formed in the tip end. The passageway slits provide a liquid passageway so that when the prior art nipple is attached to the bottle neck to cover the opening and the bottle is inverted, the animal is permitted to suck on the nipple in the same manner as it would from its mother's teat and obtain liquid from the bottle through the channel and passageway.

A problem associated with such prior art nipples involves the nursing action of an animal which generally causes the passageway slits to propagate and grow. For example, when an animal nurses, the tip end is usually pulled and squeezed by the animal causing the ends of the passageway slits to begin cracking through the tip end. Such nursing action is repeated through many cycles. As a result, the tip end eventually becomes split to a point where liquid freely flows through the passageway when the bottle is inverted, wasting liquid. Once this level of splitting has been attained, the prior art nipple is usually discarded.

Another known problem associated with prior art nipples involves leakage of liquid through an aspiration port. An aspiration port is provided to permit passage of air into the bottle to replace liquid drawn from the bottle by an animal. For example, as an animal draws liquid from the bottle, reducing the amount of liquid remaining in the bottle, the air pressure above the liquid decreases. Without permitting air to pass into the bottle to replace withdrawn liquid, a near vacuum condition eventually is created which inhibits the flow of liquid from the bottle, and prevents the animal from being able to draw additional liquid.

By providing an aspiration port, air is permitted to be passed into the bottle to equalize the pressure of the air above the liquid with that of the surrounding air. Equalization of the air pressure above the liquid thus prevents a vacuum condition from developing to enable the animal to freely draw liquid from the bottle. However, if the aspiration port is of insufficient size, air is inhibited from passing into the bottle resulting in a vacuum condition. This may inhibit the outflow of liquid through the passageway, and the effort required from the calf, or other young animal, to draw liquid from the bottle may discourage feeding or result in insufficient nourishment.

It is known to provide a conical depression formed in the base end as an aspiration port. The depression includes a hole extending through the base end adjacent to the vertex of the depression to permit passage of air through the hole and into the bottle. It is also known to provide a radially oriented slit in the base wall as an aspiration port.

It is further known to provide an aspiration port including a cylindrical depression formed in the base having a concave bottom wall. An X-shaped cut is formed through the bottom wall for permitting passage of air through the cut and into the bottle. Such an aspiration port also has a tendency to propagate and ultimately may leak during use, resulting in liquid being wasted.

Accordingly, there is a significant need to provide a nipple configured for attachment to a source of a liquid, wherein the nipple includes a liquid passageway and a means of inhibiting the passageway from becoming larger to increase the operational life of the nipple. There is also a need to provide an aspiration port which reduces the tendency to propagate resulting in leakage of liquid while an animal is nursing.

SUMMARY OF THE INVENTION

The present invention addresses the problems above and presents a significant advance in the state of the art. More particularly, the nipple includes an improved design which inhibits the liquid passageway from becoming larger, increasing the operational life of the nipple relative to prior art devices. The nipple also includes an improved aspiration port which reduces leakage of liquid relative to the prior art devices while admitting sufficient quantities of air for proper nursing of the animal.

A nipple constructed in accordance with the present invention broadly includes a base adapted for coupling to a source of liquid, and an elongated tubular wall presenting a liquid-carrying channel and defining a longitudinal axis. The tubular wall includes a proximate end adjacent to the base and a tip remote from the base. The tip substantially encloses the channel. A liquid passageway is formed through the tip for permitting passage of the liquid from the channel to an animal.

In accordance with one aspect of the present invention, a tip ridge is provided on the tip which extends substantially around the passageway. The tip ridge inhibits the passageway from cracking and growing during use, and thus increases the operational life of the nipple relative to the prior art devices.

In another aspect of the present invention, the base includes an aspiration port. The aspiration port permits passage of air into the source so that the pressure of the air above the liquid is equalized with the pressure of the air surrounding the source to prevent a near vacuum condition from developing.

The aspiration port includes an aspiration slit formed through the base. The aspiration slit is generally normal to a plane defined by the longitudinal axis of the tubular wall and the port. The aspiration slit is configured to be in a closed condition while the nipple is at rest. As the animal pulls and squeezes the nipple to draw liquid from the source, the aspiration slit is configured to open. The slit is advantageously positioned within a recess so that the entering air need only pass through the slit a distance less than the thickness of the surrounding base wall.

It will be appreciated that as liquid is drawn from the bottle, air will be drawn into the bottle through the aspiration slit. Since the opening of the aspiration slit occurs as air is being drawn into the bottle, liquid is inhibited from escaping through the aspiration slit. While the nipple is at rest, the aspiration slit remains closed so that the liquid is inhibited from escaping. As a result, the aspiration port of the present invention advantageously reduces the waste of the liquid compared with the prior art devices.

DESCRIPTION OF THE DRAWING FIGURES

FIG. 1 is a perspective view of a nipple constructed in accordance with a preferred embodiment of the present invention attached to a bottle.

FIG. 2 is a plan view of the nipple.

FIG. 3 is a cross-sectional view of the nipple taken along line 3—3 of FIG. 2.

DETAILED DESCRIPTION OF THE PREFERRED EMBODIMENT

Referring now to FIG. 1, a nipple 10 constructed in accordance with a preferred embodiment of the present invention is illustrated. The nipple 10 is configured to be attached to a bottle 12 including a neck having a neck opening for feeding a liquid stored in the bottle 12 to a young animal, such as a calf. It is also known to attach the nipple complementally configured pail.

In broad terms, the nipple 10 is unitary and includes a base 14 and an elongated tubular wall 16. The tubular wall 16 presents a liquid-carrying channel 18 defining a longitudinal axis, as shown in FIG. 3. The nipple 10 is preferably constructed from a resilient material. For example, the nipple 10 may be constructed from latex, or alternatively from a combination of natural and synthetic resins, or from any other material which yields a relatively flexible, resilient nipple 10.

The base 14 of the nipple 10 presents a generally cylindrical appearance, and includes a base sidewall 20 and a base end wall 22. Referring now to FIG. 3, the base sidewall 20 includes an inner surface 24, and defines a nipple opening 26 for permitting the base 14 to be coupled with the neck of the bottle 12. The nipple opening 26 is sized so that, when the nipple 10 is attached to the bottle 12, the inner surface 24 of the base sidewall 20 seals against the bottle neck to prevent leakage of liquid.

The base end wall 22 defines a hole 28 which is in open communication with the liquid-carrying channel 18. It will be appreciated that when the nipple 10 is attached to the bottle 12, the hole 28 of the end wall 22 is positioned adjacent to the bottle opening so that liquid from the bottle 12 is permitted to flow into the liquid-carrying channel 18.

The tubular wall 16 includes a proximate end 30 adjacent to the base 14 and a tip 32 remote from the base 14. The tip 32 substantially encloses the channel 18, and includes an interior surface 34 oriented toward the channel 18, and an exterior surface 36. The tubular wall 16 presents a generally uniform thickness adjacent to the tip 32. The tip 32 presents an arcuate crown 38 convex on the exterior surface 36 having an apex 40.

A liquid passageway 42 is formed through the tip 32 for permitting passage of the liquid from the channel 18 to the animal. The passageway 42 is defined by a pair of passageway slits 44,46 formed through the tubular wall 16 adjacent to the tip 32. The passageway slits 44,46 intersect each other adjacent to the apex 40 of the tip 32 to present a generally X-shaped appearance.

A tip ridge 48 is provided on the exterior surface 36 of the tip 32. The ridge is generally annular and extends substantially around the passageway 42, as illustrated in FIG. 2. The tip ridge 48 includes a rim 50 which is generally coplanar with the apex 40 of the tip exterior surface 36. As shown in FIG. 3, the tip ridge 48 abruptly increases the relative thickness of the tubular wall 16 surrounding the passageway 42. As a result, the tip ridge 48 inhibits the passageway slits 44,46 from cracking and growing during usage of the nipple 10.

In more detail, it will be observed (see FIG. 3) that the tip ridge 48 is defined by opposed, projecting inner (i.e., closest to the slits 44, 46) and outer (i.e., remote from the slits 44, 46) sidewalls which are disposed at an angle different from the surfaces of the tip adjacent the inner and outer walls. Thus, ridge 48 forms a thickened region on the tip relative to the thicknesses of the tip proximal to the inner and outer walls.

The base 14 includes structure defining a depression 52 in the base end wall 22 having a generally flat bottom wall 54. The depression 52 preferably presents a depth which is greater than half of a thickness presented by the base end wall 22.

An aspiration slit 56 is formed through the bottom wall 54 of the depression 52 to function as an aspiration port. By providing the aspiration slit 56, air is permitted to pass into the bottle 12 through the aspiration slit 56 so that the pressure of the air above the liquid is equalized with the pressure of the air surrounding the bottle 12.

The aspiration slit 56 is generally normal to a plane defined by the longitudinal axis of the tubular wall 16 and the aspiration port and, in the case of a circular base, such as the base 14, is roughly circumferentially oriented. As a result, when the nipple 10 is at rest, the aspiration slit 56 is configured to be in a closed condition. During use of the nipple 10, the passageway slits 44,46 are configured to open slightly as the animal pulls and squeezes the nipple 10 while drawing liquid from the bottle 12.

A base ridge 58 is provided on the base 14, extending from the base end wall 22. The base ridge 58 is generally annular. The depression 52 is radially displaced from the channel 18 so that the depression 52 interrupts the base ridge 58.

In use, the nipple 10 is attached to the neck of the bottle 12 after the bottle 12 has been filled with liquid. The liquid may be milk, or any other liquid used to nourish or medicate an animal, such as a calf. The bottle 12 is then inverted so that the nipple 10 may be offered to the animal.

As the animal nurses, the tubular wall 16 is pulled and squeezed by the animal. This action causes the passageway slits 44,46 to separate, and eventually the slits 44,46 begin to grow by propagating through the wall 16. By abruptly increasing the relative thickness of the wall 16, the tip ridge 48 inhibits cracking and spreading of the passageway slits 44,46 beyond the ridge 48. As a result, the operational life of the nipple 10 is advantageously increased relative to the prior art devices.

During use, the animal pulls and squeezes the nipple 10 in successive operations. The aspiration slit 56 is configured to open and close during these operations. By providing an aspiration slit 56 oriented generally normal to the plane defined by the longitudinal axis and the port, the aspiration slit 56 opens slightly as the nipple 10 is pulled and squeezed. Inbetween successive operations, or when the nipple 10 is otherwise at rest, the aspiration slit 56 is configured to be closed.

It will be appreciated that as the nipple 10 is pulled and squeezed, liquid is drawn from the bottle 12 by the animal, which causes air to be drawn into the bottle 12 to replace the liquid. Inasmuch as the opening of the aspiration slit 56 occurs as air is being drawn into the bottle 12, liquid is inhibited from escaping through the aspiration slit 56.

While the nipple 10 is at rest, such as inbetween successive pulling and squeezing operations, the aspiration slit 56 is configured to remain closed. Therefore, liquid is inhibited from escaping when the nipple 10 is at rest. As a result, the aspiration slit 56 of the present invention advantageously reduces the waste of the liquid compared with aspiration ports of prior art devices. The aspiration slit 56 is also more easily opened than conventional, radially oriented aspiration slits, and thus promotes easier nursing, less aggressive pulling and squeezing by the animal, and, consequently, longer nipple life.

Although the nipple 10 has been described with reference to the illustrated preferred embodiment, it is noted that variations and changes may be made, and equivalents employed herein without departing from the scope of the invention as recited in the claims.

What is claimed is:

1. A nipple of resilient material for dispensing liquid to a young animal comprising:

a base adapted for coupling to a source of liquid;

an elongated tubular wall defining a liquid-carrying channel therein, said wall having a proximate end connected to said base and a tip remote from said proximate end substantially enclosing said channel, said tip presenting a liquid passageway therethough, said liquid passageway comprising an elongated slit having a pair of opposed end; and a substantially circular tip ridge located on said tip in substantially surrounding relationship to said passageway and radially spaced from said opposed ends of said slit, said tip ridge having opposed, spaced apart, inner and outer walls projecting from and at an angle different from the surfaces of said tip adjacent the ridge inner and outer walls, said ridge forming a thickened region on the tip relative to the thicknesses of the tip proximal to said inner and outer ridge walls.

2. A nipple as set forth in claim 1, wherein said base and wall are unitary.

3. A nipple as set forth in claim 1, wherein said passageway includes an X-shaped cut through said material.

4. A nipple as set forth in claim 1, wherein said tip presents an interior surface oriented toward said channel and an exterior surface, said tip ridge being located on said exterior surface.

5. A nipple as set forth in claim 4, wherein said tip presents an arcuate crown convex on said exterior surface having an apex substantially coincident with said passageway, said tip ridge having a rim coplanar with said apex.

6. A nipple as set forth in claim 1, said base including an aspiration port for permitting the passage of air therethrough, said channel defining a longitudinal axis extending between said passageway and said base, and said port consisting of an aspiration slit oriented substantially normal to a plane defined by said axis and said port.

7. A nipple of resilient material for dispensing liquid to a young animal comprising:

a base adapted for coupling to a source of liquid presenting a depression extending partially through said base and including a raised annular base ridge on the exterior surface of said base, said ridge being interrupted by said depression; and an elongated tubular wall connected to said base and defining a liquid-carrying channel therein, said wall including a tip having a liquid passageway therethrough, said channel extending between said passageway and said base, and defining a longitudinal axis, said base presenting an aspiration port through said base and located in said depression for the passage of air therethrough, said port including an aspiration slit.

8. The nipple of claim 7, said depression comprising a generally planar wall portion, said aspiration slit being provided through said planar wall.

9. The nipple of claim 7, said base including a wall transverse to said longitudinal axis, said depression and said base ridge being formed in said transverse wall.

* * * * *